US012776649B2

(12) United States Patent
Bahramirad et al.

(10) Patent No.: US 12,776,649 B2
(45) Date of Patent: Oct. 27, 2026

(54) METHODS AND SYSTEMS FOR ASSESSMENT OF DISTRIBUTED ENERGY RESOURCES

(71) Applicant: Commonwealth Edison Company, Chicago, IL (US)

(72) Inventors: Shay Bahramirad, Chicago, IL (US); Esa Paaso, Chicago, IL (US); Nayeem Mohammad Abdullah, Chicago, IL (US); Maigha, Chicago, IL (US); Ralph Masiello, Chicago, IL (US); Elli Ntakou, Chicago, IL (US); Farnaz Farzan, Chicago, IL (US); Amin Khodaei, Chicago, IL (US)

(73) Assignee: Commonwealth Edison Company, Chicago, IL (US)

( * ) Notice: Subject to any disclaimer, the term of this patent is extended or adjusted under 35 U.S.C. 154(b) by 571 days.

(21) Appl. No.: 17/781,999

(22) PCT Filed: Dec. 2, 2020

(86) PCT No.: PCT/US2020/062880
§ 371 (c)(1),
(2) Date: Jun. 2, 2022

(87) PCT Pub. No.: WO2021/113355
PCT Pub. Date: Jun. 10, 2021

(65) Prior Publication Data

US 2023/0113696 A1 Apr. 13, 2023

Related U.S. Application Data

(60) Provisional application No. 62/942,597, filed on Dec. 2, 2019.

(51) Int. Cl.
*H02J 3/38* (2026.01)
*H02J 3/001* (2026.01)
*H02J 3/16* (2026.01)
*H02J 101/24* (2026.01)

(52) U.S. Cl.
CPC .......... *H02J 3/381* (2013.01); *H02J 3/00125* (2020.01); *H02J 3/16* (2013.01); *H02J 2101/24* (2026.01)

(58) Field of Classification Search
CPC .......... H02J 3/381; H02J 3/00125; H02J 3/16; H02J 2300/24; H02J 13/00002; H02J 3/06; H02J 3/001; Y02E 40/70; Y02E 60/00; Y04S 10/12; Y04S 10/30
See application file for complete search history.

(56) References Cited

U.S. PATENT DOCUMENTS

2011/0292799 A1* 12/2011 Dottling .................. H04L 47/10
370/235

OTHER PUBLICATIONS

Paper "The Value of Distributed Energy Resources to the Grid: Introduction to the Concepts of Marginal Cost of Capacity and Locational Marginal Value", by Richard Tabors, etc., published in Jan. 2019, [online], retrieved from <https://hdl.handle.net/10125/59782> on Oct. 1, 2024 (Year: 2019).*

(Continued)

*Primary Examiner* — Charles Cai
(74) *Attorney, Agent, or Firm* — Ballard Spahr LLP

(57) ABSTRACT

Methods and systems are described for determining value and placement of Distributed Energy Resources (DERs).

20 Claims, 10 Drawing Sheets

(56) References Cited

OTHER PUBLICATIONS

Paper "Locational Marginal Value of Distributed Energy Resources as Non-Wires Alternatives", by Panagiotis Andrianesis, etc., published in 2019, [online], retrieved from <https://ieeexplore.ieee.org/abstract/document/8731686> (Year: 2019).*
Andrianesis et al., "Locational Marginal Value of Distributed Energy Resources as Non-Wires Alternatives," 2019, in ARXIV.org (online), pp. 1-10, https://arxiv.org/pdf/1811.09006.pdf.
Tabors et al., "The Value of Distributed Energy Resources to the Grid: Introduction to the Concepts of Marginal Cost of Capacity and Locational Marginal Value," 2019, in Scholar Space (online), pp. 3465-3476, https://scholarspace.monoa.haawaii.edu/bitstream/10125/59782/0342.pdf.

* cited by examiner

METHODS AND SYSTEMS FOR ASSESSMENT OF DISTRIBUTED ENERGY RESOURCES

CROSS REFERENCE TO RELATED APPLICATION

This application is a national phase filing under 35 U.S.C. § 371 of International Application No. PCT/US2020/062880, filed Dec. 2, 2020, which claims the benefit of U.S. Provisional Application No. 62/942,597, filed Dec. 2, 2019, entitled "Methods and Systems for Assessment of Distributed Energy Resources. The entirety of each application is hereby incorporated by reference.

BACKGROUND

Distribution utilities have dealt with load growth by commensurate network investments. However, recent acceleration of Distributed Energy Resources (DERs) has raised the opportunity for considering DERs as Non-Wires Alternatives (NWAs) that enable deferral or avoidance of costly and often disruptive network investments. Unfortunately, there are no solutions to effectively assess value of DERs and placement of DERs in the distribution system.

SUMMARY

Disclosed are systems, apparatuses, and methods comprising determining, for each line of a plurality of lines connected to a plurality of nodes, based at least in part on real and reactive power flow, an amount of overload for each time segment of a time period, identifying, based on the amount of overload for each time segment of the time period, one or more overloaded lines, determining, for each of the one or more overloaded lines, based on a number of time segments of the time period that the one or more overloaded lines is overloaded, a allocated cost of capacity (ACC) for each overloaded time segment, determining, for each of the one or more overloaded lines, a locational marginal value (LMV) for a real power injection at each node connected to the one or more overloaded lines, determining, for each of the one or more overloaded lines, a locational marginal value (LMV) for a reactive power injection at each node connected to the one or more overloaded lines, determining, for each of the one or more overloaded lines, based on the LMV for the real power injection, the LMV for the reactive power injection, and the ACC for each overloaded time segment, a spatiotemporal distributed energy resource (DER) value, identifying, based on the spatiotemporal DER value, one or more nodes as candidate nodes for DER injection, and causing a DER injection at at least one of the one or more candidate nodes to alleviate overload.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
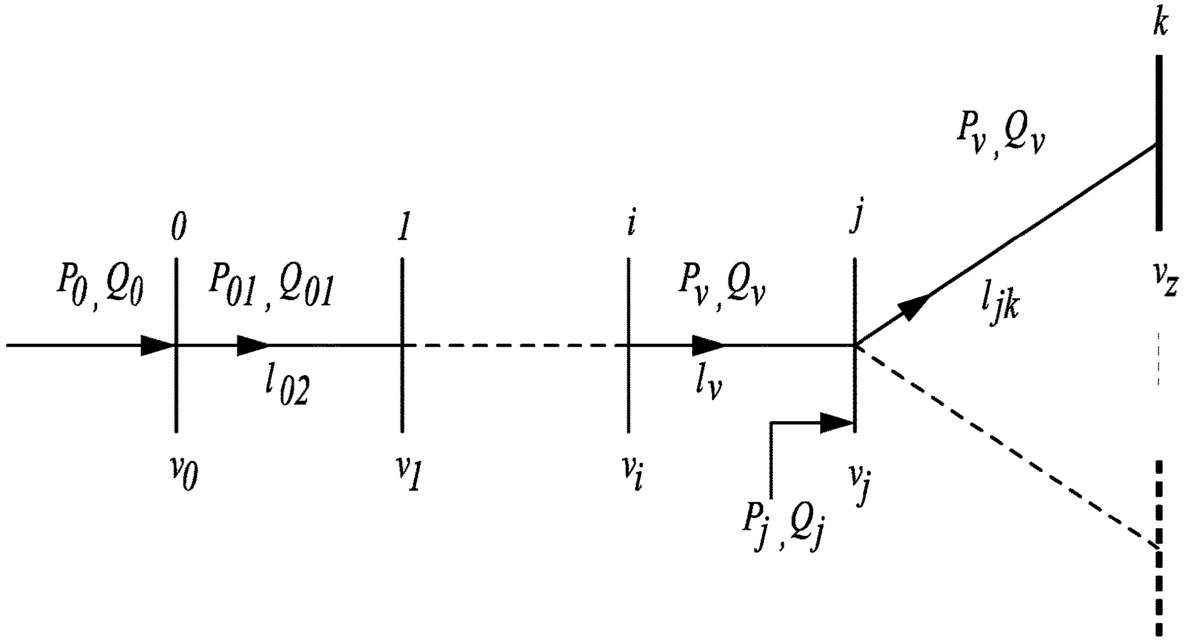
FIG. 1 illustrates an example tree network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions. It is further contemplated that the methods and systems described herein may be executed via cloud-based architectures and systems.

Traditionally, DERs referred to small and dispersed generation resources, such as solar or Combined Heat and Power (CHP), connected to the distribution network. DERs are typically associated with Distributed Generation (DG). Although a widely acceptable definition of DERs is not yet cast in concrete, their concept has evolved to include not only DG (solar, CHP, small wind, etc.), but also energy storage, demand response, electric vehicles (EVs), micro-grids, energy efficiency, combinations thereof, and the like. However, a consistent framework that compares DER adoption to traditional wires investments is still lacking. Indeed, in the current state-of-the-art, utility planners consider specific DERs assuming that their costs, capabilities, and the like, constitute known input to their NWA planning studies. However, when the attraction of future DERs that are currently not in place is examined as a NWA, this input is in a state of flux, and hence unavailable with sufficient certainty. Most importantly, since committing the study to uncertain input assumptions may affect its outcome significantly in favor or against specific technologies, regulators and stakeholders are likely, and justifiably so, to question them. Methods and systems are described that consider DERs as NWAs that does not rely on estimates of specific DER characteristics; it is instead founded on quantifying generic DER spatiotemporal marginal "value-to-the-grid" encompassing a marginal cost concept during hours of capacity constraint violations.

The methods and systems described evaluate generic real and reactive power producing/consuming DERs as distribution NWAs. High fidelity AC circuit analysis may be used to estimate spatiotemporal marginal costs to the power system unbundled to their energy and grid components and quantify the generic DER spatiotemporal marginal value-to-the-grid.

The methods and systems described build upon short term locational marginal costing and pricing analysis. Allocated Cost of Capacity (ACC) and Locational Marginal Value (LMV) may be used to quantify the value-to-the-grid of generic DER additions as NWAs that could or would be located on the grid to relieve constraint violations (e.g., line overloads, nodal over/under-voltages), while participating in available energy market products and services. It should be noted that the terms LMV and ACC or similar expressions have been used in the literature of transmission and distribution (T&D) networks for several decades. For instance, while this description refers to ACC, it is to be understood that allocated cost of capacity and marginal cost of capacity (MCC) have similar meaning and may be used interchangeably. For instance, Locational Marginal Prices (LMPs) characterize today's nodal electricity markets that originate from the seminal work on spot pricing of electricity; LMV has been used in a different context to characterize the value of storage capacity; there is also an emerging literature on Distribution LMPs (DLMPs). The term Marginal Distribution Capacity Cost (MDCC) has been also used extensively in the capacity deferral and DG planning literature. As used herein, LMV and ACC are construed differently to reflect the new context that they are used in.

More specifically, the ACC may be computed from the cost of actual capital investments required to relieve anticipated constraint violations. This cost is used to quantify the penalty for exacerbating constraints encountered in an infeasible AC optimal power flow (OPF) problem. The LMV of a generic real power or reactive power DER represents the value of an incremental kilowatt (kW) or kilowatt volt-ampere reactive (kVAR) provided to relieve the cost associated with violated constraints. LMVs vary by node of the network and by hour. As such, they assign values to specific DERs based on both their location and hourly profile across the year. Since the ACC computation results in a cost per unit of constraint violation, it impacts the LMV in a spatiotemporal manner to the extent that an incremental DER at a specific node and hour relieves each violated constraint with varying sensitivity.

In an embodiment, the methods and systems described can rely on the cost of the best required wires investment to estimate generic real and reactive LMVs that are independent of any specific DER costs and capabilities, and provide the theoretically optimal amount and value of generic DERs required to defer the wires investment. The associated annual DER procurement costs can be compared to the annual rate payer avoided costs that would have resulted from the deferred wires investment. Such comparisons performed on a yearly basis can inform whether DER adoption is a desirable non-wires investment alternative.

The methods and systems described embed the explicit distribution planning problem into a spatiotemporal generic DER valuation framework, which is invariant of specific DER technologies and their associated costs. Generic DER LMV is dependent only on the network characteristics, anticipated loads, constraint violations determined by detailed AC OPF, and the cost of required wires investments that may be needed to render the AC OPF problem feasible and/or alleviate the network thermal or voltage violations. Specific DERs required to alleviate network constraint violations can be construed as a composition of generic DER quantities. The LMV of actual DERs and their affordable compensation can be derived from the generic DER LMV projected on actual DER potential real and reactive power hourly trajectories at their specific locations.

The methods and systems are applicable to any type of power network, meshed or radial or a combination. As an example, the methods and systems described may assume a balanced radial distribution network, represented by graph ($\mathcal{N}$, $\in$). $\mathcal{N}$ is the set of nodes and ε the set of edges. Nodes are indexed by 0, 1, . . . , n, where 0 is the root node. $\mathcal{N}\equiv\{0,1, \ldots, n\}$, and $\mathcal{N}^+\equiv\mathcal{N}\backslash\{0\}$. Pairs (i,j) represent edges that denote lines connecting node i with node j. The set of lines ε has n pairs, which are ordered by the j-th node. The radial structure allows a unique path from the root node 0 to node j, with i the node that precedes j in this path. For each node $i \in \mathcal{N}$, let $V_i$ be the magnitude of the voltage, with $$v_i \equiv V_i^2,$$

and minimum (maximum) voltage limits denoted by $$V_i^{min}(V_i^{max}).$$

For each line $(i,j) \in E$, $r_{ij}$ is the resistance, $x_{ij}$ the reactance, $I_{ij}$ the magnitude of the current, with $$l_{ij} \equiv I_{ij}^2, I_{ij}^{max}$$

the ampacity, and $P_{ij}$ and $Q_{ij}$ the sending-end real and reactive power flow, respectively. $P_i$ and $Q_i$ denote the net real and reactive power injections at node i. A positive (negative) value of $P_i$ refers to generation (consumption); similarly for the reactive power. A sketch of a tree network is shown in FIG. 1.

A branch flow model, which is a simplified, yet exact, representation of conventional AC power flow equations for a radial network may be used. The resulting AC OPF optimization problem may be expressed as:

$$\min_{P_0,Q_0,P_{ij},Q_{ij},v_i,l_{ij}} c^P P_0 + c^Q Q_0, \tag{1}$$

subject to:

$$P_0 = P_{01}, (\lambda_0^P), \tag{2a}$$

$$Q_0 = Q_{01}, (\lambda_0^Q), \tag{2b}$$

$$P_{ij} - l_{ij}r_{ij} + P_j - \sum_{k:j\to k} P_{jk} = 0, (\lambda_j^P)\ \forall j \in \mathcal{N}^+, \tag{2c}$$

$$Q_{ij} - l_{ij}x_{ij} + Q_j - \sum_{k:j\to k} Q_{jk} = 0, (\lambda_j^Q)\ \forall j \in \mathcal{N}^+, \tag{2d}$$

$$v_j = v_i - 2(r_{ij}P_{ij} + x_{ij}Q_{ij}) + (r_{ij}^2 + x_{ij}^2)l_{ij},\ \forall j \in \mathcal{N}^+, \tag{3}$$

$$l_{ij} = \frac{P_{ij}^2 + Q_{ij}^2}{v_i},\ \forall (i, j) \in \mathcal{E}, \tag{4}$$

$$(V_i^{min})^2 \le v_i \le (V_i^{max})^2,\ \forall i \in \mathcal{N}, \tag{5}$$

$$l_{ij} \le (I_{ij}^{max})^2,\ \forall (i, j) \in \mathcal{E}, \tag{6}$$

where $P_0$, $Q_0$, $P_{ij}$, $Q_{ij}$, are real, and $v$ ; $l_{ij}$ non-negative. The time index is omitted for brevity.

The objective function (1) represents the cost of real and reactive power procured at the T&D interface root node, with $c^P$ the real power LMP, and $c^Q$ a given reactive power compensation opportunity cost. Notably, there is no transmission wholesale market price for reactive power, for reasons that, among others, include local market power concerns. However, there is a cost for the provision of this service, which, in certain situations, can be viewed as the opportunity cost of a local generator (in the transmission system) providing this service, associated with foregoing the use of a unit of real power production.

The real and reactive power balance at each node are represented by (2*a*)-(2*d*); their associated dual variables $$\lambda_i^P, \lambda_i^Q$$

denote the real and reactive power DLMPs at node i. Constraints (3) and (4) define nodal voltage and line current. Constraints (5) and (6) impose voltage and current limits. Constraint (4) is non-convex. Replacing (4) by inequality $$v_i l_{ij} \ge P_{ij}^2 + Q_{ij}^2,\ \forall (i, j) \in \mathcal{E}, \tag{7}$$

which is a convex Second Order Cone Programming (SOCP) constraint, introduces a convex relaxation of the problem. As described herein, this relaxation is exact; hence, instead of (4), (7) is used in the described formulations.

Figure 2:
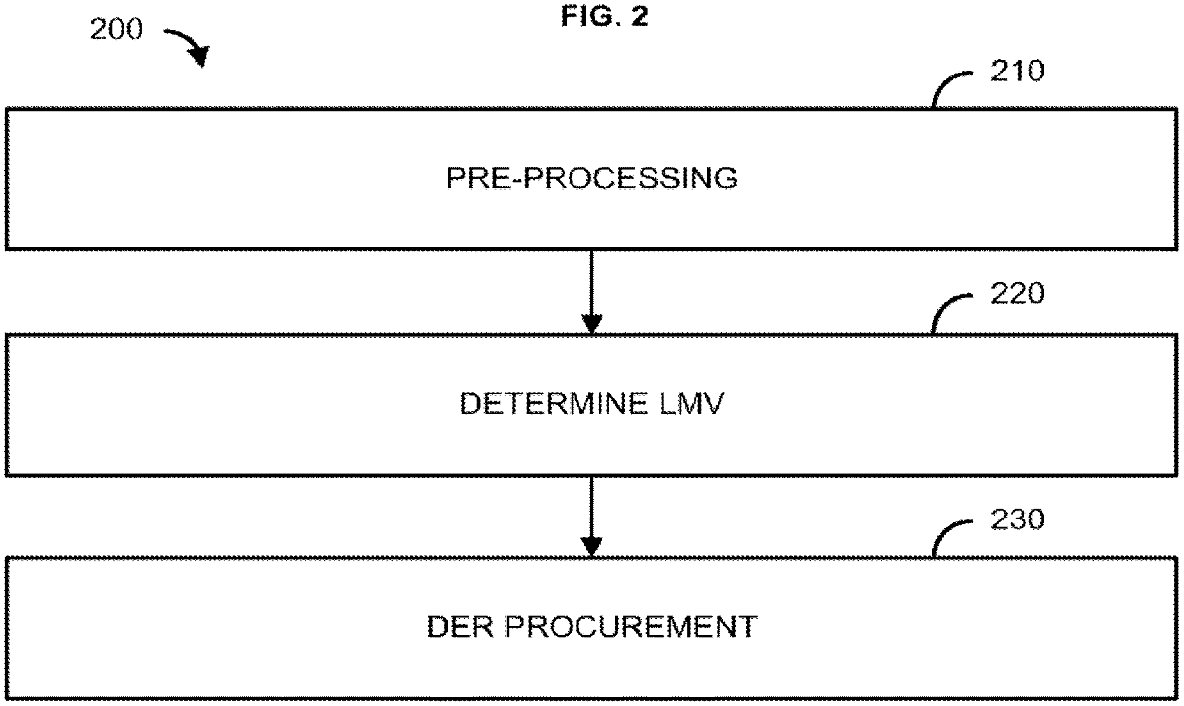
FIG. 2 illustrates example method.

FIG. 2 illustrates a method 200 comprising a pre-processing step 210 which may determine a constraint violation overload and an ACC, an LMV determination step 220 which may determine real and reactive power LMVs for each hour and location, and a DER Procurement step 230 which may determine an optimal addition of DERs that relieve the overload.

Pre-processing step 210 may comprise an overload determination. An amount of overload may be determined for each time segment (e.g., hour) of a time period (e.g., a year).

For illustrative purposes, the methods and systems will be described in terms of hours as the time segment and a year as the time period, other time segments and time periods are contemplated. The branch flow model may be used and, in the absence of inter-temporal constraints, time segment calculations are parallelizable. In particular, omitting ampacity constraint (6) results in the following OPF problem:

$$\text{Opt1: (1), s.t. (2}a\text{)–(2}d\text{), (3), (5), and (7),} \tag{8}$$

which, because of (7), is a Quadratically Constrained Programming (QCP) problem, more specifically an SOCP problem. Opt1 essentially optimizes the voltage at the root node, since the net real/reactive power injections are fixed and the remaining variables (flows, currents, voltages) can be obtained by the load flow equations. The solution of Opt1, which allows overload to occur, yields the values of $l_{ij,t}$, from which hourly overload $\Delta\hat{I}_{ij,t}$ may be determined in Amps for each line segment (i,j) exceeding its ampacity:

$$\Delta\hat{I}_{ij,t} = \max\{0, \sqrt{l_{ij,t}} - I_{ij}^{max}\}. \tag{9}$$

$\Delta\hat{I}_{ij,t}$ is used (and not $\Delta I_{ij,t}$) to distinguish the calculated (hat) values in the absence of the ampacity constraint (6).

Pre-processing step 210 may comprise an ACC determination. The ACC may be determined from the best grid investment cost, denoted by C (in $), obtained by a traditional wires solutions planning problem.

In an embodiment the best grid investment involves line upgrades, and hence the project cost C can be directly allocated to each line segment. Let $c_{ij}$ be the cost for increasing the line capacity (ampacity) by $$\Delta I_{ij}^{max}$$

(in Amps), with $\Sigma_{(i,j)} c_{ij}=C$; and let $T_{ij}$ represent the number of hours in the year that the line is overloaded, i.e., the number of hours the line upgrade is required within the year. Since the horizon is one year, annualize the line upgrade cost to equal its anticipated impact on the rate base and scale by a factor α. Then define the ACC overload factor, denoted by $w_{ij}$, which is henceforth used interchangeably to ACC, as:

$$w_{ij} = \frac{\alpha \cdot c_{ij}}{\Delta I_{ij}^{max} \cdot T_{ij}}, \tag{10}$$

where $w_{ij}$ (ACC) is measured in $ per Amp of new capacity per (overloaded) hour, for the period of one year. This definition is in fact the average incremental cost of capacity. We use the term marginal for two reasons: (a) a small upgrade renders incremental an approximation of marginal, and (b) $w_{ij}$ is used in (12) as the coefficient of a linear ampacity overload cost where average and marginal coincide.

In another embodiment the project may involve an investment that cannot be allocated directly to the overloaded lines, e.g., building new lines as part of a reconfiguration scheme. The project cost can still be allocated to the overloaded lines, taking into account their maximum overload, $$\Delta\hat{I}_{ij}^{max} = \max_{t}\{\Delta\hat{I}_{ij,t}\},$$

and their length $L_{ij}$, as follows:

$$c_{ij} = \frac{\Delta\hat{I}_{ij}^{max} L_{ij}}{\sum_{(i,j)} \Delta\hat{I}_{ij}^{max} L_{ij}} C. \tag{11}$$

Then apply (10) to derive the ACC, using the calculated value $$\Delta\hat{I}_{ij}^{max}$$

instead of the actual increase in ampacity $$\Delta I_{ij}^{max}$$

resulting from the line upgrade. Hence, (11) is a reasonable, indirect, method for the allocation of the project cost, when a direct allocation is not applicable.

LMV Determination step 220 may determine a generic DER spatiotemporal value. The overload $\Delta I_{ij,t}$ may be monetized by the ACC factor $w_{ij}$; the new objective function that replaces (1) is:

$$\min_{P_0,Q_0,P_{ij},Q_{ij},v_i,l_{ij},\Delta I_{ij}} c^P P_0 + c^Q Q_0 + \sum_{(i,j)} w_{ij}\Delta I_{ij}, \tag{12}$$

where the time index is omitted. In (12), $\Delta I_{ij}$ represents a new variable introduced for each overloaded line, so that the related costs are only applied to (i,j) exhibiting $\Delta I_{ij}>0$ during a specific hour. Since the solution of Opt1 is known from the previous step, the overload variable $\Delta I_{ij}$ may be defined using the 1st order Taylor approximation, as follows:

$$\Delta I_{ij} = 0.5(\sqrt{l_{ij}^0})^{-1} l_{ij} + 0.5\sqrt{l_{ij}^0} - I_{ij}^{max}, \tag{13}$$

where $$l_{ij}^0$$

is the current (magnitude squarea) value derived from the solution of Opt1.

The cost for the overload in (12) represents the annualized pro-rated cost of the line, since the amount of new capacity needed in each hour, $\Delta I_{ij}$ is accounted for, instead of the maximum (lumpy) new capacity of the line $$(\Delta I_{ij}^{max}).$$

Alternative approaches can be used, as for instance, the Net Present Value of the annual revenue requirement of the capacity upgrade over an appropriate planning horizon. A benefit is that the inclusion of the marginal avoided cost in $w_{ij}$ results in the DER investor and the customers sharing the avoided cost. If the entire avoided cost of planned traditional investments, including excess capacity, were included in $w_{ij}$, then all of the avoided cost could be captured by generic DERs via the LMV mechanism, and customers/ratepayers would realize no net savings.

For each hour in which overload was identified in the solution of Opt1 at step 210, the following optimization problem may be solved:

$$\text{Opt2: (12), s.t. (2}a\text{)–(2}d\text{), (3), (5), (7) and (13),} \tag{14}$$

which is also a QCP (SOCP) problem. The LMVs are the shadow prices of (2$c$)-(2$d$), i.e., $$\lambda_j^P, \lambda_j^Q,$$

referred to as P-LMV and Q-LMV, receptivity, since they represent the marginal value of real and reactive power at a specific node and hour. The linearization in (13) is performed around the optimal operating point obtained by the exact AC OPF model Opt1, and relates variable $\Delta I_{ij}$ to branch flow model variable $l_{ij}$. Opt2 is solved to derive dual variables $$\lambda_j^P \text{ and } \lambda_j^Q$$

(LMVS). All equivalent approach can be to employ sensitivity analysis, which would require the calculation of the partial derivatives of the branch flow variables with respect to the real and reactive power net demand, at the system's optimal operating point. The P-LMV (Q-LMV) at a specific node can be obtained by the partial derivative of the objective function in (12) w.r.t. net real (reactive) demand at that node. The third term involves the partial derivative of $$\Delta I_{ij} = \sqrt{l_{ij}} - I_{ij}^{max}$$

which relates to the partial derivative of variable $l_{ij}$ with the coefficient $$0.5\left(\sqrt{l_{ij}^0}\right)^{-1};$$

see also (13). Furthermore, by measuring the overload in Amps, using variable $\Delta I_{ij}$, the methods relate the ACC (measured in \$ per Amp) to the upgrade of a line that is typically measured in Amps. In another embodiment, the overload can be measured in Amps$^2$, and the ACC can be adjusted accordingly. The methods would not utilize the linearization in (13), as a variable $$\Delta l_{ij} = \max\left[0, l_{ij} - \left(I_{ij}^{max}\right)^2\right]$$

could be used. This option can be viewed as measuring the overload with the amount of thermal losses above the rated capacity.

DER Procurement step 230 may determine an optimal generic DER allocation that alleviates overload at a specific hour. Variables $$P_j^{DER} \geq 0, \text{ and } Q_j^{DER}$$

may be introduced for real and reactive power procured from generic DERs at node j, at a cost equal to P-LMV and Q-LMV, respectively, as estimated in the pricing step. The new objective function is defined by $$\min_{P_0,Q_0,P_{ij},Q_{ij},v_i,l_{ij}P_j^{DER},Q_j^{DER}} c^P P_0 + c^Q Q_0 + \sum_{j\in N^+} \left(\lambda_j^P P_j^{DER} + \lambda_j^Q Q_j^{DER}\right), \tag{15}$$

where the time index is omitted since all variables/parameters refer to a specific hour. Note that $$\lambda_j^P \text{ and } \lambda_j^Q$$

are parameters whose values are obtained from the solution of Opt2. The power balance constraints (2$c$)-(2$d$) are modified accordingly:

$$P_{ij} - l_{ij}r_{ij} + P_j + P_j^{DER} - \sum_{k:j\to k} P_{jk} = 0, \left(\lambda_j^P\right)\forall j \in N^+, \tag{16a}$$

$$Q_{ij} - l_{ij}r_{ij} + Q_j + Q_j^{DER} - \sum_{k:j\to k} Q_{jk} = 0, \left(\lambda_j^Q\right)\forall j \in N^+. \tag{16b}$$

Network constraints—e.g., service transformer rated capacities—may impose a bound on the real and reactive power DER quantities that can be procured at a certain node:

$$P_j^{DER} \leq \overline{P}_j^{DER}, \forall j \in N^+, \tag{17a}$$

$$-\overline{Q}_j^{DER} \leq Q_j^{DER} \leq \overline{Q}_j^{DER}, \forall j \in N^+. \tag{17b}$$

The optimal generic DER allocation may be obtained by solving the following (QCP/SOCP) optimization problem:

$$\text{Opt3: (15), s.t. (2}a\text{)-(2}b\text{), (16}a\text{)-(16}b\text{), (3)-(6), and (17}a\text{)–(17}b\text{).} \tag{18}$$

The solution of Opt3 provides an estimate of the DER quantities required to satisfy ampacity constraints at a minimal procurement cost. In the absence of DER quantity bound constraints (17$a$)-(17$b$), the solution of Opt3 is a lower bound on the actual DER procurement cost. Inclusion of constraints (17$a$)-(17$b$), calibrated appropriately for a specific feeder, yields a more realistic estimate of the DER procurement cost. An improvement realized by the described optimal DER procurement is that all network constraints are observed eliminating the potential of excessive DER additions at one or more locations introducing new problems in back flow, high voltage, etc.

The solution of Opt2 identifies the non zero LMV's as locations that would help in alleviating a constraint on the distribution system. While LMV's with zero value help the user to identify the locations which will not be able to alleviate the constraints. Opt3 further enhances the analyses by providing the locations with the highest impact in alleviating the constraint. Eventually helping the user identify the locations which may alleviate the constraints and the optimal among those. The user may then use this information to screen the DERs based on locational value.

The methods and systems described were applied to data obtained from feeders representing two typical investment projects. The data was sanitized, while preserving the salient features of the topology and electrical properties, and a high fidelity single-phase AC OPF model was employed. The positive sequence of balanced three-phase versions were used and compared with three-phase load flow results of the unbalanced feeders. Since both feeders did not exhibit over/under-voltage issues that might require upgrades targeted to deal with voltage violations—in which cases potentially high unbalances would require a three-phase representation, the single-phase model proved adequate in illustrating the proposed framework in typical and most representative feeders experiencing overload, in an easy to follow and yet sufficiently realistic and accurate exposition. The distribution utility expects load growth and/or potential new customers/loads that absent a DER solution would require a wires investment. The cost of this investment can be either associated directly to feeder lines and equipment (Feeder 1) or involve new reconfiguration capability to connect to another feeder (Feeder 2). Both feeders have loop capabilities and tie switches, but they are typically operated in a radial topology through predetermined schemes. Indeed, network reconfiguration is applied to relieve congestion and mitigate unbalances in the operational timescale. Topology configuration choices are implicitly captured by the described methods and systems, since the SOCP model can be applied for different network configurations, allowing for the optimal network topology to be used for each time period, driven by the anticipated loads. An extension of the SOCP problem to explicitly include reconfiguration options affects only the pre-processing step 210. The mixed-integer second-order conic programming (MISOCP) model, optimizing available reconfiguration actions, can provide the optimal switch settings that yield an SOCP problem reflecting optimal network configuration for a specific load level. Once the optimal configuration is found, it is passed to the LMV Determination step 220 to calculate LMVs.

Figure 3:
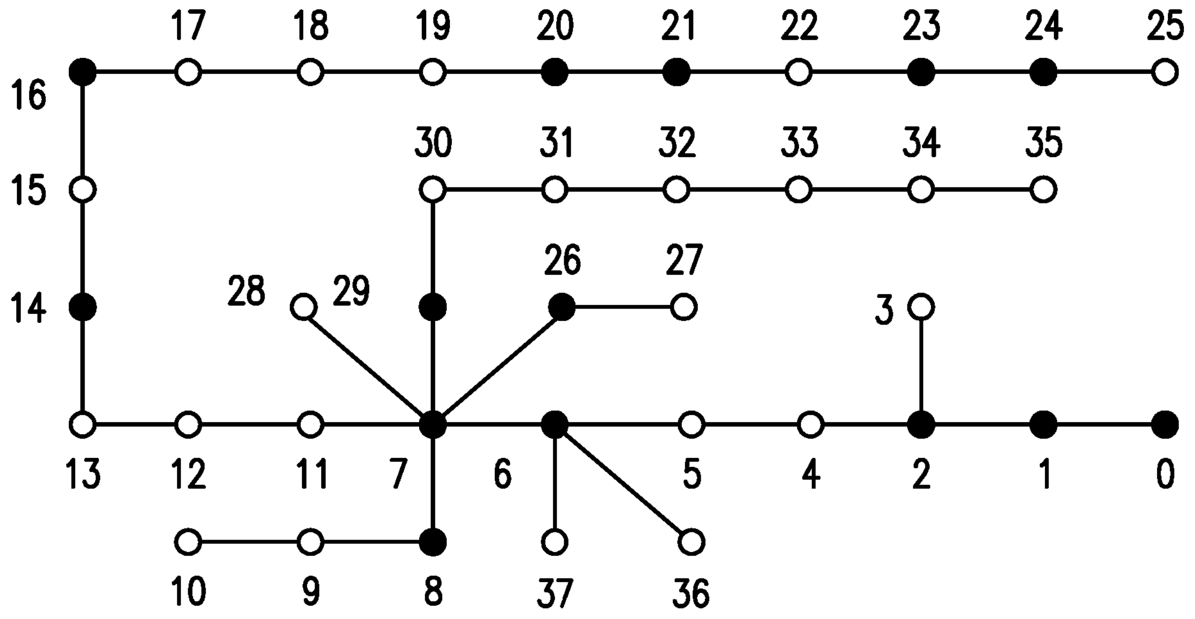
FIG. 3 illustrates an example topology of a Sample Feeder.

The Sample Feeder of FIG. 3 is comprised of 38 nodes and is expected to exhibit overload in various lines. Its topology is shown in FIG. 3 and the line data in Table I. In FIG. circles with white fills indicate loads (22 nodes). Nodes 4 and 37 (gray fill) have fixed capacitors of 1.2 MVAR each. Feeder Nominal Voltage: 12.5 kV. Voltage limits: 0.95 and 1.04 p.u. (12.5 kV base). Sbase=1MVA, Ibase=46.188. The best alternative project for the Sample Feeder involves a connection with neighboring feeders, with an annualized cost of $76,200.

TABLE I

| Line | R (Ω) | X (Ω) | Rating (A) |
|---|---|---|---|
| (0-1) | 0.024 | 0.048 | 765 |
| (1-2) | 0.227 | 0.743 | 765 |
| (2-3) | 0.076 | 0.018 | 95 |
| (2-4) | 0.044 | 0.143 | 765 |
| (4-5) | 0.026 | 0.084 | 765 |
| (5-6) | 0.011 | 0.011 | 340 |
| (6-7) | 0.023 | 0.024 | 340 |
| (7-8) | 0.075 | 0.027 | 150 |
| (8-9) | 0.114 | 0.027 | 95 |
| (9-10) | 0.19 | 0.068 | 150 |
| (7-11) | 0.064 | 0.023 | 150 |
| (11-12) | 0.279 | 0.099 | 150 |
| (12-13) | 0.254 | 0.09 | 150 |
| (13-14) | 0.022 | 0.005 | 95 |

TABLE I-continued

| Line | R (Ω) | X (Ω) | Rating (A) |
|---|---|---|---|
| (14-15) | 0.057 | 0.02 | 150 |
| (15-16) | 0.127 | 0.045 | 150 |
| (16-17) | 0.049 | 0.012 | 95 |
| (17-18) | 0.095 | 0.023 | 95 |
| (18-19) | 0.137 | 0.033 | 95 |
| (19-20) | 0.129 | 0.031 | 95 |
| (20-21) | 0.015 | 0.005 | 150 |
| (21-22) | 0.051 | 0.012 | 95 |
| (22-23) | 0.069 | 0.017 | 95 |
| (23-24) | 0.032 | 0.011 | 150 |
| (24-25) | 0.096 | 0.023 | 95 |
| (7-26) | 0.111 | 0.113 | 340 |
| (26-27) | 0.002 | 0.001 | 150 |
| (7-28) | 0.242 | 0.086 | 150 |
| (7-29) | 0.027 | 0.028 | 340 |
| (29-30) | 0.175 | 0.062 | 150 |
| (30-31) | 0.043 | 0.015 | 150 |
| (31-32) | 0.208 | 0.074 | 150 |
| (32-33) | 0.109 | 0.039 | 150 |
| (33-34) | 0.051 | 0.018 | 150 |
| (34-35) | 0.165 | 0.059 | 150 |
| (6-36) | 0.049 | 0.018 | 150 |
| (6-37) | 0.002 | 0.001 | 150 |

Figure 4:
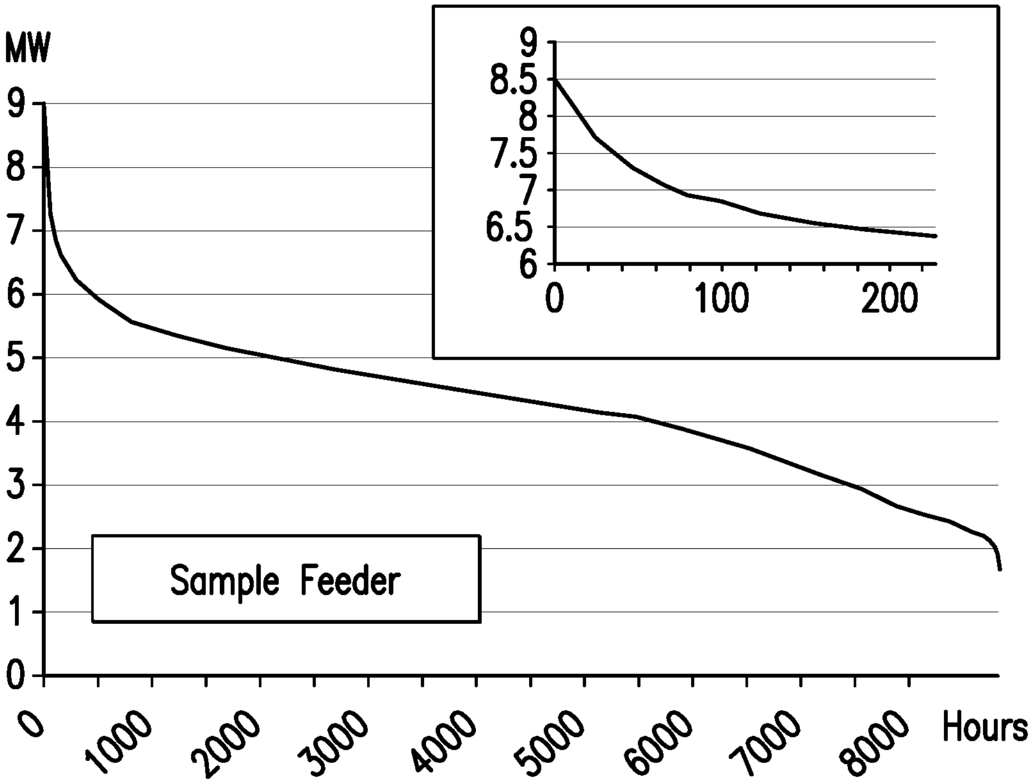
FIG. 4 illustrates an example yearly load (in MW) duration curves.

Yearly load duration curves for the Sample Feeder are shown in FIG. 4. Power factors at individual nodes range from 0.85 (for commercial nodes) to 0.95 (for residential nodes). Annualization is done with $\alpha$=0.15.

As applied to the Sample Feeder data, at step 210 of the method 200, the Sample Feeder experiences overload during 485 hours. In particular, 485 hours on line segment (5-6), 71 hours on (29-30), and 53 hours on (6-36).

Since the investment is part of a reconfiguration project, the project cost can be allocated to each line using $$ACC_{ij} = C_I \times \frac{\Delta \hat{I}_j}{\sum_{mn,t} \Delta \hat{I}_{mn,t}} \times \frac{L_{ij}}{\sum_{mn} L_{mn}}.$$

For line lengths (in ft), $L_{5,6}$=370; $L_{29,30}$=1520; $L_{6,36}$=430. The cost is allocated 15.9% to line (5-6), 65.5% to line (29-30), and 18.6% to line (6-36).

At step 220 of the method 200, following the solution of $$LMV_{i,t}^P = \sum_j ACC_j \times \frac{\partial \Delta \hat{V}_{j,t}}{\partial P_{i,t}} + \sum_{mm} ACC_{mm} \times \frac{\partial \Delta \hat{I}_{mn,t}}{\partial P_{i,t}} \text{ and } LMV_{i,t}^Q = \sum_j ACC_j \times \frac{\partial \Delta \hat{V}_{j,t}}{\partial Q_{i,t}} + \sum_{mm} ACC_{mm} \times \frac{\partial \Delta \hat{I}_{mn,t}}{\partial Q_{i,t}} Opt2,$$

Figure 5:
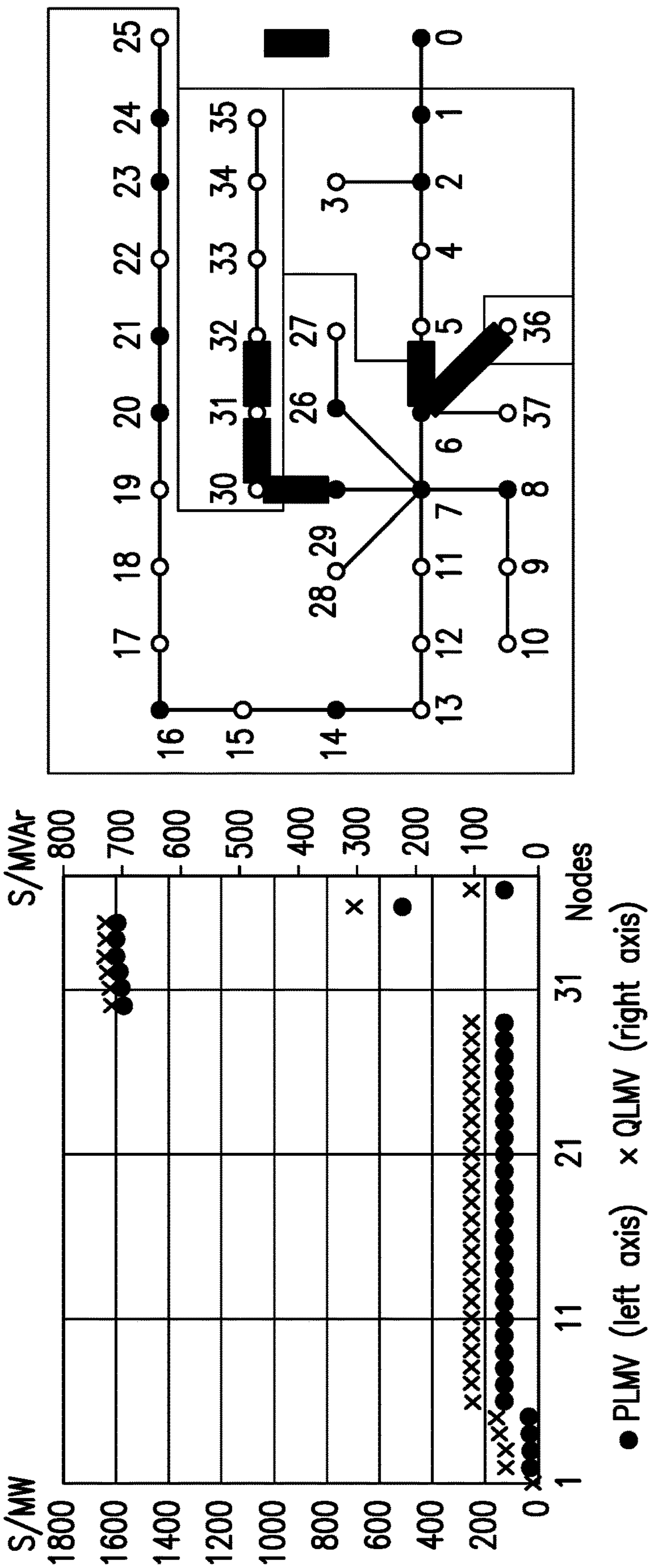
FIG. 5 illustrates exemplary P-LMV and Q-LMV.

P-LMVs and Q-LMVs for peak hour 5534 are shown in FIG. 5. The LMVs increase along the overloaded lines: the LMVs exhibit their first step at node 6, and its lateral node 37, then the LMVs increase at lateral 36, and take similar values from node 7 to 29, then the LMVs increase gradually over nodes 30, 31 and 32, and take similar values at nodes 33-35.

Figure 6:
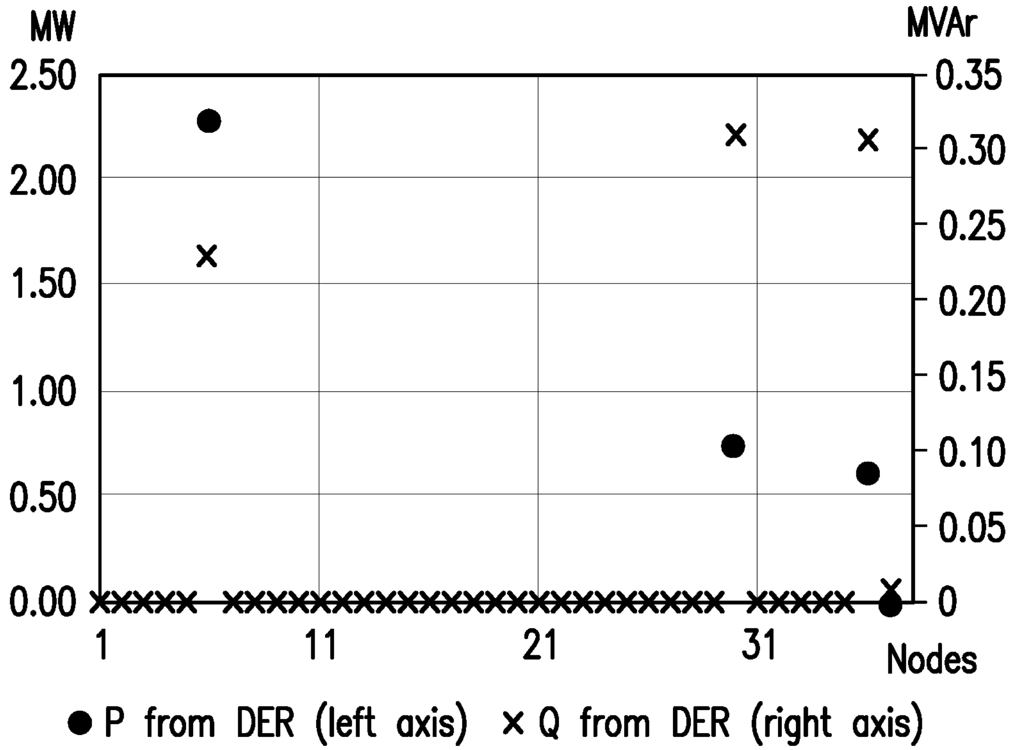
FIG. 6 illustrates exemplary generic DER optimal dispatch.

FIG. 6 shows TEMPORAL LMV of various nodes in the Sample Feeder as a function of MW and MV Ar per node.

Figure 7:
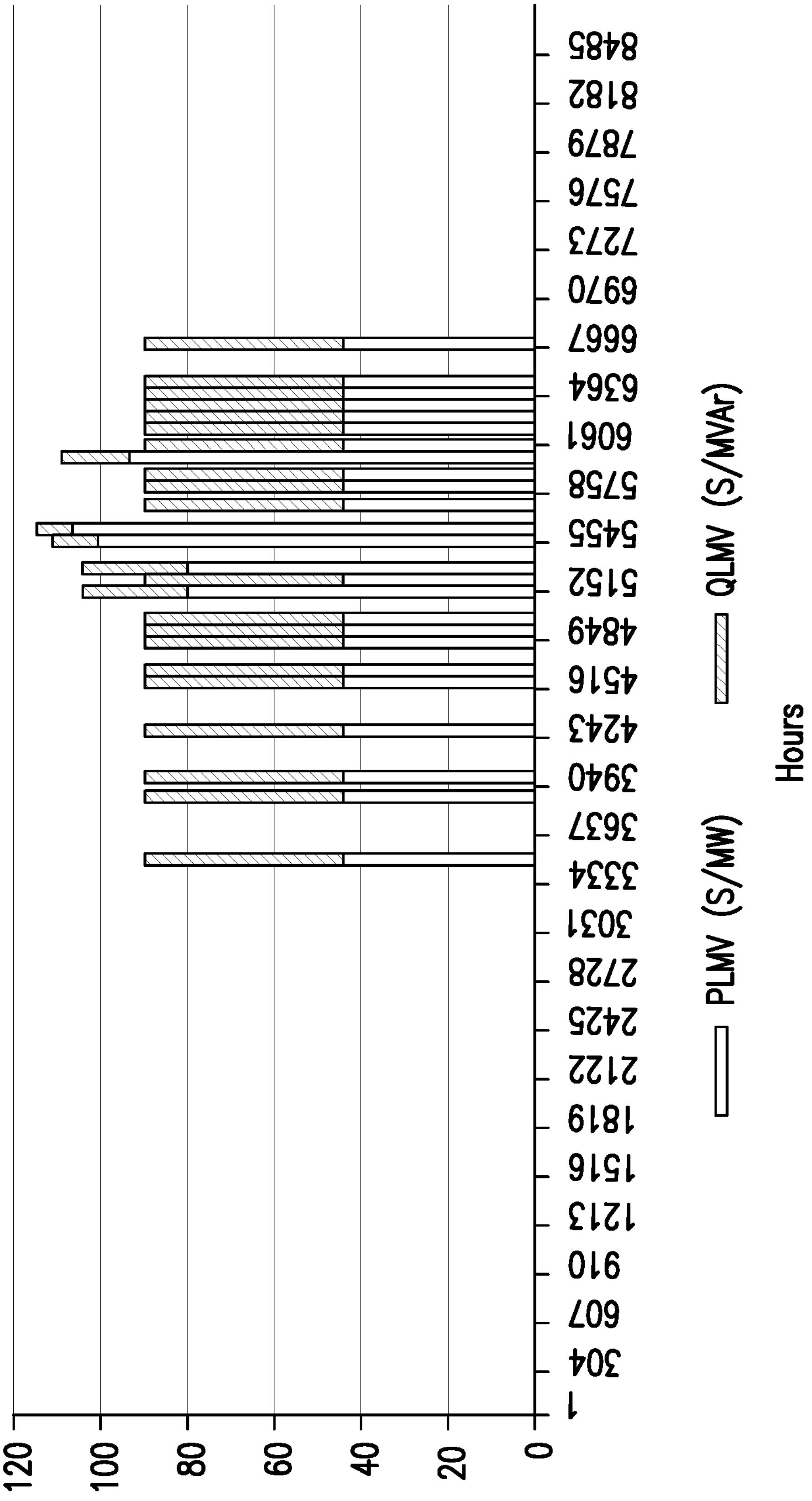
FIG. 7 illustrates exemplary temporal LMV.

FIG. 7 shows a plot of P-LMV (in dollars per MW) and Q-LMV (in dollars per MVar) of node 37 at various hours.

Figure 8:
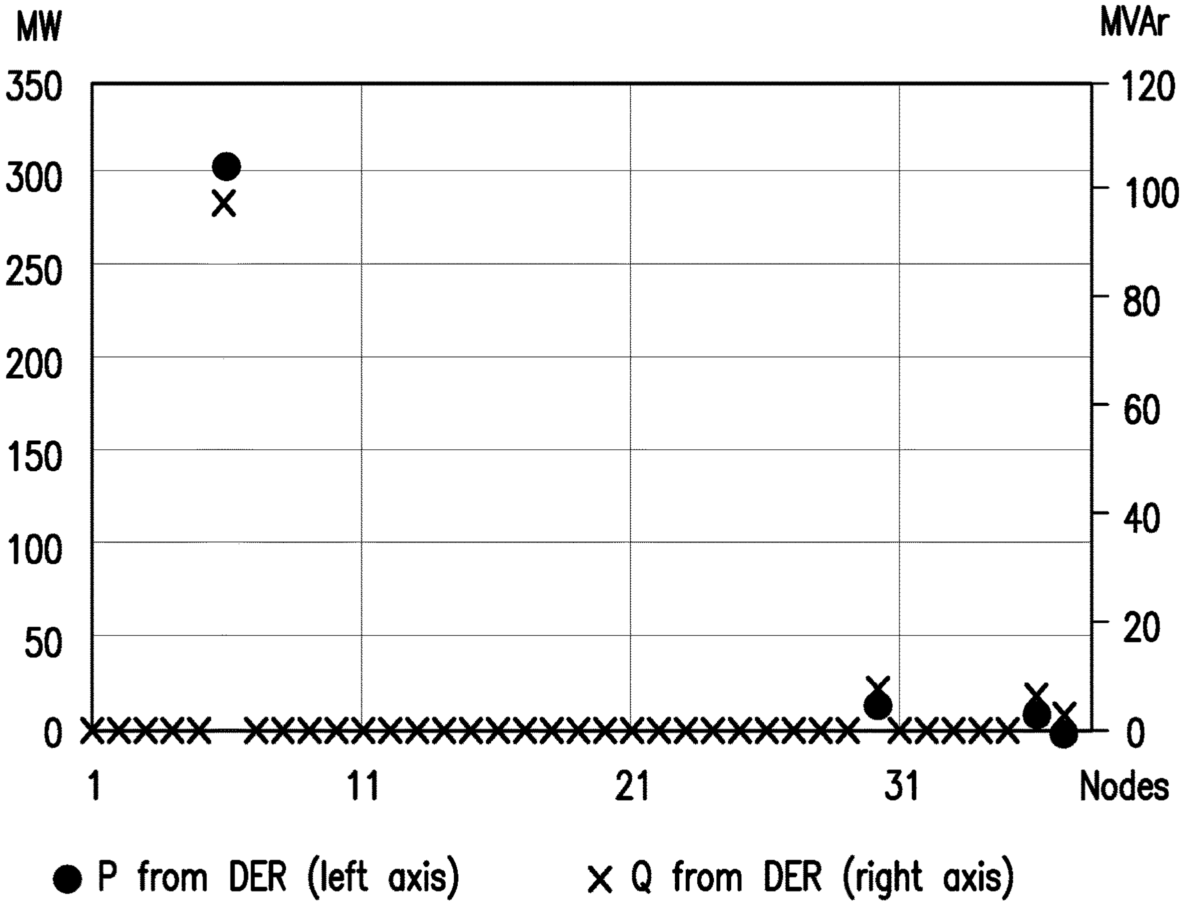
FIG. 8 illustrates exemplary total generic DER procurement (MWh and MVARh) and total generic DER procurement cost per node.

At step 230 of the method 200, shown in FIG. 8 the generic DER procurement for the peak hour (5534) is plotted. The generic DER procurement can be obtained by solving the following:

$$\min\sum_t\sum_i\left|LMV_{i,t}^P\times P_{i,t}^{DER}+LMV_{i,t}^Q\times Q_{i,t}^{DER}\right| \quad (19)$$

Subject to $$l_{ij,t}\geq\frac{P_{ij,t}^2+Q_{ij,t}^2}{u_{i,t}},\ \forall\ t,\ (i,\ j)\in\mathcal{E} \quad (20)$$

$$u_{j,t}=u_{i,t}-2r_{ij}P_{ij,t}-2x_{ij}Q_{ij,t}+\left(r_{ij}^2+x_{ij}^2\right)l_{ij,t},\ \forall\ t,\ (i,\ j)\in L \quad (21)$$

$$P_{i,t}^{dem}-P_{i,t}^{DER}=P_{ij,t}-r_{ij}l_{ij,t}-\sum_{k|(j,k)\in L}P_{jk,t},\ \forall\ t,\ i\in\mathcal{N} \quad (22)$$

$$Q_{i,t}^{dem}-Q_{i,t}^{DER}=Q_{ij,t}-x_{ij}l_{ij,t}-\sum_{k|(j,k)\in L}Q_{jk,t},\ \forall\ t,\ i\in\mathcal{N} \quad (23)$$

$$V_i^{min}\leq u_{i,t}\leq V_i^{max} \quad (24)$$

$$l_{ij,t}(h)\leq I_{ij}^{max} \quad (25)$$

However, location plays a crucial role in this feeder. Due to the physics of power lfow, thermal overloads can be relieved through DERs in downstream locations only. Therefore, the overload of line (6-36) can only be relieved by DERs located at node 36. On the other hand, overload of line (5-6) can be relieved by DERs located at any node downstream of node 6 (similarly to a root node line overload). The results are interpreted as follows: since the objective function is the minimization of the LMV-based DER dispatch costs, the DERs will be located directly downstream of the overloads. In this case, a DER is located at the downstream end of all three overloaded lines. The real power dispatch from DER is higher closer to the highest overload. The reactive power dispatch contributes to the thermal overloads by bringing the power factor to unity.

As already stated, an improvement realized by the methods and systems described is enabling a distribution utility to rely on information that is in its planning province; determining the cost of the best grid investment alternative is within the utility's domain and expertise; and identifying where to connect a DER.

An issue arises that in many cases the best wires alternative may be too "large" or too "lumpy" to be economic when DER investment alternatives are considered. Said differently, if the full cost of a large investment justified by economies of scale and higher future capacity were to be used to value DERs, then the DERs would be overvalued by unjustifiably high overload costs. The methods and systems described provide two distinct remedies: First, the cost of the investment is annualized, e.g., the wires investment cost is translated to its annual impact on the rate base. Second, its cost is pro-rated to the capacity that load growth indicates will be required during the next year or the relevant planning horizon. Annualization and pro-rating introduces the notion of the ACC, which is used in the valuation of generic DERs that are in fact invariant of actual DER costs and capabilities.

Given the desire to derive as much as possible actual DER-independent NWA results, the methods and systems described have not focused on actual DERs with their specific capabilities and costs. The described P-LMV and Q-LMV of a generic DER at a specific location and hour can be used to calculate the value of an actual DER with specific capabilities. For instance, a solar PV DER equipped with a smart inverter (assuming it is sized to its nameplate capacity K) will be constrained for its real and reactive power provision, P and Q, by its capacity, i.e., $P^2+Q^2\leq K^2$, and also P will be constrained by the irradiation level (say p, with $0\leq p\leq 1$), i.e., $P\leq pK$. The value of this solar PV at each hour will be calculated by the provided P and Q multiplied with P-LMV and Q-LMV, respectively. Of course, the hourly allocation of the anticipated overload is significant in determining the ability of a solar PV to act as a NWA, given its irradiation level constraint. As an example, shown in FIG. 12, the hourly allocation of the overload (in terms of estimated real power required) for the constrained scenario of Feeder 1. The overload appears in summer daytime hours 9-20 and solar PV is an excellent fit for contributing in real power as a NWA. In general, this analysis can be performed for each DER type (even for hybrid systems involving storage), by the utility or the DER investor.

Lastly, while re-conductoring has served as the primary example of wires investments in our case studies, other possibilities such as repowering (raising circuit voltage level), replacing switchgear or limiting station exit cables, and other measures can be similarly treated. In this respect, the cost of required voltage regulation or circuit impedance reduction, addition of capacitor banks or LTC regulators can be calculated and used to derive appropriate costs for over and under voltage constraint violation.

Figure 9:
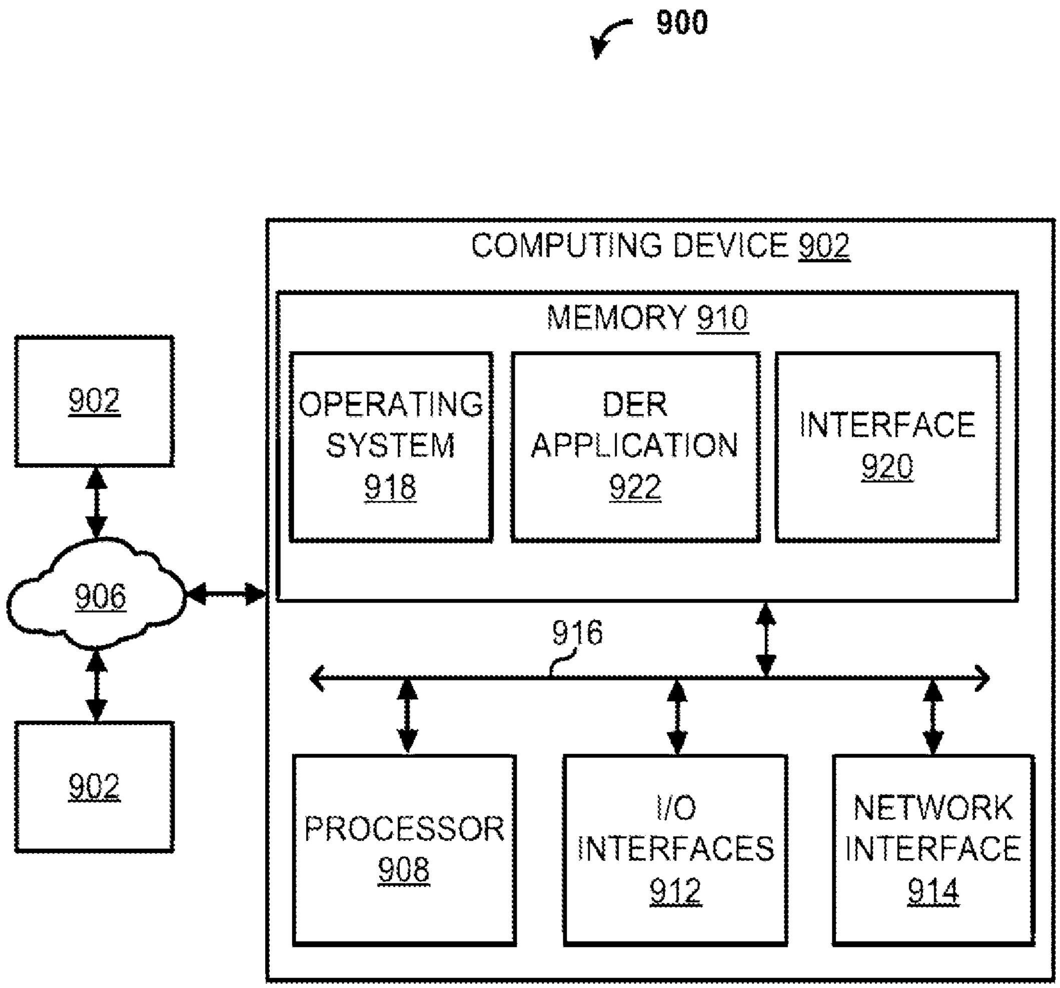
FIG. 9 illustrates an example operating environment.

FIG. 9 is a block diagram depicting an environment 900 comprising non-limiting examples of computing devices 902 connected through a network 906, such as the Internet. In an aspect, some or all steps of any described method may be performed on a computing device as described herein. The computing device 902 can be for example, a mobile phone, a tablet computer, a laptop computer, or a desktop computer. The computing device 902 can be configured to store a DER application 922 and to operate a user interface 920 (e.g., via a web browser). A user on the computing device 902 may connect to the DER application 910 with the user interface 920.

The computing device 902 can be a digital computer that, in terms of hardware architecture, generally includes a processor 908, memory system 922, input/output (I/O) interfaces 912, and network interfaces 914. These components (908, 910, 912, and 914) are communicatively coupled via a local interface 916. The local interface 916 can be, for example but not limited to, one or more buses or other wired or wireless connections, as is known in the art. The local interface 916 can have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 908 can be a hardware device for executing software, particularly that stored in memory system 910. The processor 908 can be any custom made or commercially available processor, a central processing unit (CPU), an auxiliary processor among several processors associated with the computing device 902, a semiconductor-based microprocessor (in the form of a microchip or chip set), or generally any device for executing software instructions. When the computing device 902 is in operation, the processor 908 can be configured to execute software stored within the memory system 910, to communicate data to and from the memory system 910, and to generally control operations of the computing device 902 pursuant to the software.

The I/O interfaces 912 can be used to receive user input from and/or for providing system output to one or more devices or components. User input can be provided via, for example, a keyboard and/or a mouse. System output can be provided via a display device and a printer (not shown). I/O interfaces 912 can include, for example, a serial port, a parallel port, a Small Computer System Interface (SCSI), an IR interface, an RF interface, and/or a universal serial bus (USB) interface.

The network interface 914 can be used to transmit and receive from the computing device 902 on the network 906. The network interface 914 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi), or any other suitable network interface device. The network interface 914 may include address, control, and/or data connections to enable appropriate communications on the network 906.

The memory system 910 can include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 910 may incorporate electronic, magnetic, optical, and/or other types of storage media. Note that the memory system 910 can have a distributed architecture, where various components are situated remote from one another, but can be accessed by the processor 908.

The software in memory system 910 may include one or more software programs, each of which comprises an ordered listing of executable instructions for implementing logical functions. In the example of FIG. 9, the software in the computing device 902 can comprise the user interface 920, the DER application 922, and a suitable operating system (O/S) 918. The operating system 918 essentially controls the execution of other computer programs, such as the DER application 922 and the user interface 920, and provides scheduling, input-output control, file and data management, memory management, and communication control and related services.

For purposes of illustration, application programs and other executable program components such as the operating system 918 are illustrated herein as discrete blocks, although it is recognized that such programs and components can reside at various times in different storage components of the computing device 902. An implementation of the DER application 922 and/or the user interface 920 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 10:
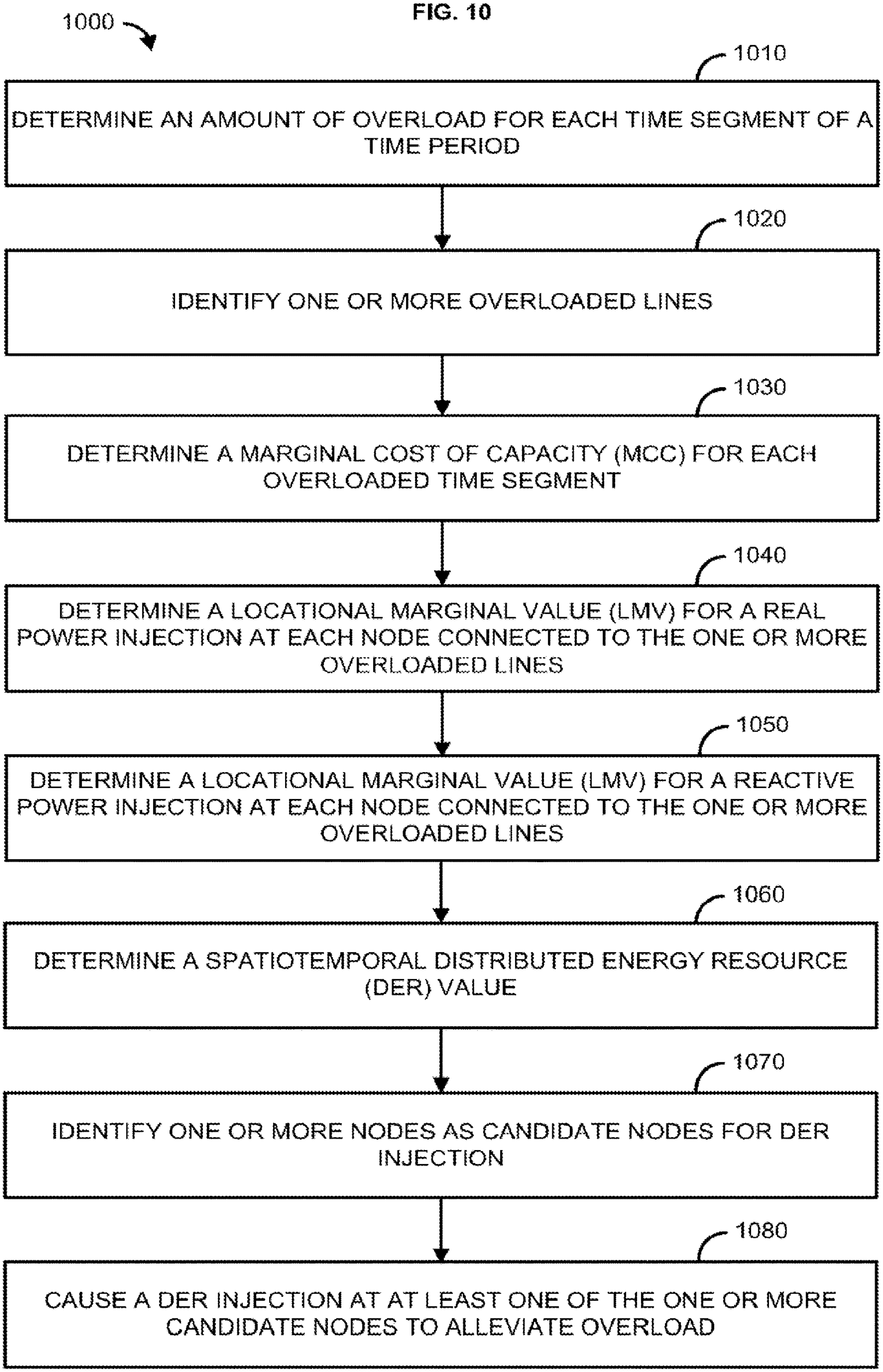
FIG. 10 illustrates an example method.

In an embodiment, illustrated in FIG. 10, the DER application 922 can be configured to perform a method 1000 comprising determining, for each line of a plurality of lines connected to a plurality of nodes, based at least in part on real and reactive power flow, an amount of overload for each time segment of a time period at 1010. The plurality of lines can comprise a plurality of power lines and the plurality of nodes comprises a plurality of feeders. The plurality of power lines and the plurality of feeders can comprise a radial distribution network. Determining the amount of overload for each time segment of a time period can comprise determining, for each node, a magnitude of voltage and determining, for each line, a resistance, a reactance, a magnitude of current, an ampacity, sending-end real power flow, and sending-end reactive power flow. A positive value of sending-end real power flow or sending-end reactive power flow can indicate generation and a negative value of sending-end real power flow or sending-end reactive power flow can indicate consumption. The time segment can be an hour and the time period can be a year. The amount of overload for each time segment of the time period can be measured in amps.

The method 1000 can comprise identifying, based on the amount of overload for each time segment of the time period, one or more overloaded lines at 1020. Identifying, based on the amount of overload for each time segment of the time period, one or more overloaded lines can comprise determining a line with the amount of overload exceeds an ampacity of the line as an overloaded line.

The method 1000 can comprise determining, for each of the one or more overloaded lines, based on a number of time segments of the time period that the one or more overloaded lines is overloaded, an allocated cost of capacity (ACC) for each overloaded time segment at 1030. The ACC for each overloaded line can indicate a cost to increase a capacity of the overloaded line. Determining the spatiotemporal distributed energy resource (DER) value can comprise determining, for each of the one or more overloaded lines, based on the ACC, a cost of the overload.

The method 1000 can comprise determining, for each of the one or more overloaded lines, a locational marginal value (LMV) for a real power injection at each node connected to the one or more overloaded lines at 1040.

The method 1000 can comprise determining, for each of the one or more overloaded lines, a locational marginal value (LMV) for a reactive power injection at each node connected to the one or more overloaded lines at 1050.

The method 1000 can comprise determining, for each of the one or more overloaded lines, based on the LMV for the real power injection, the LMV for the reactive power injection, and the ACC for each overloaded time segment, a spatiotemporal distributed energy resource (DER) value at 1060.

The method 1000 can comprise identifying, based on the spatiotemporal DER value, one or more nodes as candidate nodes for DER injection at 1070. Identifying, based on the spatiotemporal DER value, the one or more nodes as candidate nodes for DER injection can comprise determining DER quantities required to satisfy ampacity constraints at a minimal procurement cost. For example, identifying, based on an amount of under voltage or an amount of over voltage for each time segment of the time period, one or more under voltage nodes and one or more over voltage nodes may comprise determining a node with an amount of under voltage or an amount of over voltage exceeding a voltage limit of the node as an under voltage node or an over voltage node.

The method 1000 can comprise causing a DER injection at at least one of the one or more candidate nodes to alleviate overload at 1080.

The method 1000 may further comprise determining, for each node, based at least in part on real and reactive power flow, an amount of under voltage or an amount of over voltage for each time segment of a time period. The method 1000 may further comprise identifying, based on the amount of under voltage or the amount of over voltage for each time segment of the time period, one or more of one or more under voltage nodes and one or more over voltage nodes. The method 1000 may further comprise determining, for each of the one or more under voltage nodes and the one or more over voltage nodes, based on a number of time segments of the time period that the one or more under voltage or over voltage is violated, an allocated cost of capacity (ACC) for each under voltage time segment or each over voltage time segment. The method 1000 may further comprise determining, for one or more of the one or more under voltage nodes and the one or more over voltage nodes, a locational marginal value (LMV) for a real power injection at each node connected to the one or more overloaded lines and one or more of the one or more under voltage nodes and the one or more over voltage nodes. The method may further comprise determining, for each of the one or more under voltage nodes and over voltage nodes, a locational marginal value (LMV) for a reactive power injection at each node connected to the one or more overloaded lines and the under voltage nodes or over voltage nodes. The method 1000 may further comprise determining, for each of the one or more overloaded lines and under voltage nodes or over voltage nodes, based on the LMV for the real power injection, the LMV for the reactive power injection, and the ACC for each overloaded lines and under voltage time segment and over voltage time segment, a spatiotemporal distributed energy resource (DER) value. The method 1000 may further comprise causing a DER injection at at least one of the one or more candidate nodes to alleviate one or more of overload, under voltage, and over voltage.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:

determining, for each line of a plurality of lines connected to a plurality of nodes, based at least in part on real and reactive power flow, an amount of overload for each time segment of a time period;

identifying, based on the amount of overload for each time segment of the time period, one or more overloaded lines;

determining, for each of the one or more overloaded lines, based on a number of time segments of the time period that the one or more overloaded lines are overloaded, an allocated cost of capacity (ACC) for each overloaded time segment;

determining, for each of the one or more overloaded lines, based on a partial derivative of a magnitude of current of the one or more overloaded lines with respect to real power injection at each node, a locational marginal value (LMV) for a real power injection at each node connected to the one or more overloaded lines;

determining, for each of the one or more overloaded lines, based on a partial derivative of the magnitude of current of the one or more overloaded lines with respect to reactive power injection at each node, a locational marginal value (LMV) for a reactive power injection at each node connected to the one or more overloaded lines;

determining, for each of the one or more overloaded lines, based on the LMV for the real power injection, the LMV for the reactive power injection, and the ACC for each overloaded time segment, a spatiotemporal distributed energy resource (DER) value;

identifying, based on the spatiotemporal DER value, one or more nodes as one or more candidate nodes for DER injection; and causing a DER injection at at least one of the one or more candidate nodes to alleviate overload.

2. The method of claim 1, wherein the plurality of lines comprise a plurality of power lines and the plurality of nodes comprises a plurality of feeders.

3. The method of claim 2, wherein the plurality of power lines and the plurality of feeders comprise a radial distribution network.

4. The method of claim 1, wherein the determining the amount of overload for each time segment of the time period comprises:

determining, for each node, a magnitude of voltage; and determining, for each line, a resistance, a reactance, a magnitude of current, an ampacity, sending-end real power flow, and sending-end reactive power flow.

5. The method of claim 4, wherein a positive value of sending-end real power flow or sending-end reactive power flow indicates generation and a negative value of sending-end real power flow or sending-end reactive power flow indicates consumption.

6. The method of claim 1, wherein the time segment is an hour and the time period is a year.

7. The method of claim 1, wherein the amount of overload for each time segment of the time period is measured in amps.

8. The method of claim 7, wherein the identifying, based on the amount of overload for each time segment of the time period, the one or more overloaded lines comprises determining a line with the amount of overload exceeding an ampacity of the line as an overloaded line.

9. The method of claim 1, wherein the ACC for each overloaded line indicates a cost to increase a capacity of the overloaded line.

10. The method of claim 1, wherein determining the spatiotemporal distributed energy resource (DER) value comprises determining, for each of the one or more overloaded lines, based on the ACC, a cost of the overload.

11. The method of claim 1, wherein identifying, based on the spatiotemporal DER value, the one or more nodes as the one or more candidate nodes for DER injection comprises determining DER quantities required to satisfy ampacity constraints at a minimal procurement cost.

12. The method of claim 1, further comprising:

determining, for each node, based at least in part on real and reactive power flow, an amount of under voltage or an amount of over voltage for each time segment of a time period;

identifying, based on the amount of under voltage or the amount of over voltage for each time segment of the time period, one or more of one or more under voltage nodes and one or more over voltage nodes;

determining, for each of the one or more under voltage nodes and the one or more over voltage nodes, based on a number of time segments of the time period that the one or more under voltage or over voltage are violated, an allocated cost of capacity (ACC) for each under voltage time segment or each over voltage time segment;

determining, for one or more of the one or more under voltage nodes and the one or more over voltage nodes, a locational marginal value (LMV) for a real power injection at each node connected to the one or more overloaded lines and one or more of the one or more under voltage nodes and the one or more over voltage nodes;

determining, for each of the one or more under voltage nodes and over voltage nodes, a locational marginal value (LMV) for a reactive power injection at each node connected to the one or more overloaded lines and the under voltage nodes or over voltage nodes;

determining, for each of the one or more overloaded lines and under voltage nodes or over voltage nodes, based on the LMV for the real power injection, the LMV for the reactive power injection, and the ACC for each of the one or more overloaded lines and under voltage time segment and over voltage time segment, a spatiotemporal distributed energy resource (DER) value; and causing a DER injection at at least one of the one or more candidate nodes to alleviate one or more of overload, under voltage, and over voltage.

13. The method of claim 12, wherein one or more of the amount of under voltage for each time segment of the time period and the amount of over voltage for each time segment of the time period are measured in volts.

14. The method of claim 12, wherein the ACC for each under voltage node or each over voltage node indicates a cost to mitigate a violation of the under voltage node or the over voltage node.

15. The method of claim 12, wherein determining the spatiotemporal distributed energy resource (DER) value comprises determining, for each of the one or more under voltage nodes and the one or more over voltage nodes, based on the ACC, one or more of a cost of the under voltage and a cost of the over voltage.

16. The method of claim 12, wherein the identifying, based on the amount of under voltage or the amount of over voltage for each time segment of the time period, the one or more under voltage nodes and the one or more over voltage nodes comprises determining a node with an amount of under voltage or an amount of over voltage exceeding a voltage limit of the node as an under voltage node or an over voltage node.

17. An apparatus comprising:

one or more processors; and memory storing processor-executable instructions that, when executed by the one or more processors, cause the apparatus to:

determine, for each line of a plurality of lines connected to a plurality of nodes, based at least in part on real and reactive power flow, an amount of overload for each time segment of a time period;

identify, based on the amount of overload for each time segment of the time period, one or more overloaded lines;

determine, for each of the one or more overloaded lines, based on a number of time segments of the time period that the one or more overloaded lines are overloaded, an allocated cost of capacity (ACC) for each overloaded time segment;

determine, for each of the one or more overloaded lines, based on a partial derivative of a magnitude of current of the one or more overloaded lines with respect to real power injection at each node, a locational marginal value (LMV) for a real power injection at each node connected to the one or more overloaded lines;

determine, for each of the one or more overloaded lines, based on a partial derivative of the magnitude of current of the one or more overloaded lines with respect to reactive power injection at each node, a locational marginal value (LMV) for a reactive power injection at each node connected to the one or more overloaded lines;

determine, for each of the one or more overloaded lines, based on the LMV for the real power injection, the LMV for the reactive power injection, and the ACC for each overloaded time segment, a spatiotemporal distributed energy resource (DER) value;

identify, based on the spatiotemporal DER value, one or more nodes as one or more candidate nodes for DER injection; and cause a DER injection at at least one of the one or more candidate nodes to alleviate overload.

18. The apparatus of claim 17, wherein the processor-executable instructions, when executed by the one or more processors, further cause the apparatus to:

determine, for each node, based at least in part on real and reactive power flow, an amount of under voltage or an amount of over voltage for each time segment of a time period;

identify, based on the amount of under voltage or the amount of over voltage for each time segment of the time period, one or more of one or more under voltage nodes or one or more over voltage nodes;

determine, for each of the one or more under voltage nodes or the one or more over voltage nodes, based on a number of time segments of the time period that the one or more under voltage or over voltage is violated, an allocated cost of capacity (ACC) for each under voltage time segment or each over voltage time segment;

determine, for each of the one or more under voltage nodes and the one or more over voltage nodes, a locational marginal value (LMV) for a real power injection at each node connected to the one or more overloaded lines and one or more of the one or more under voltage nodes and the one or more over voltage nodes;

determine, for each of the one or more under voltage nodes and over voltage nodes, a locational marginal value (LMV) for a reactive power injection at each node connected to the one or more overloaded lines and the under voltage nodes and over voltage nodes;

determine, for each of the one or more overloaded lines and under voltage nodes or over voltage nodes, based on the LMV for the real power injection, the LMV for the reactive power injection, and the ACC for each of the one or more overloaded lines and under voltage time segment and over voltage time segment, a spatiotemporal distributed energy resource (DER) value; and cause a DER injection at at least one of the one or more candidate nodes to alleviate one or more of overload, under voltage, and over voltage.

19. A system comprising:

a first computing device configured to:

determine, for each line of a plurality of lines connected to a plurality of nodes, based at least in part on real and reactive power flow, an amount of overload for each time segment of a time period;

identify, based on the amount of overload for each time segment of the time period, one or more overloaded lines;

determine, for each of the one or more overloaded lines, based on a number of time segments of the time period that the one or more overloaded lines are overloaded, an allocated cost of capacity (ACC) for each overloaded time segment;

determine, for each of the one or more overloaded lines, based on a partial derivative of a magnitude of current of the one or more overloaded lines with respect to real power injection at each node, a locational marginal value (LMV) for a real power injection at each node connected to the one or more overloaded lines;

determine, for each of the one or more overloaded lines, based on a partial derivative of the magnitude of current of the one or more overloaded lines with respect to reactive power injection at each node, a locational marginal value (LMV) for a reactive power injection at each node connected to the one or more overloaded lines;

determine, for each of the one or more overloaded lines, based on the LMV for the real power injection, the LMV for the reactive power injection, and the ACC for each overloaded time segment, a spatiotemporal distributed energy resource (DER) value;

identify, based on the spatiotemporal DER value, one or more nodes as one or more candidate nodes for DER injection; and cause a DER injection at at least one of the one or more candidate nodes to alleviate overload; and a second computing device configured to:

output the one or more candidate nodes.

20. One or more non-transitory computer-readable media storing processor-executable instructions that, when executed by at least one processor, cause the at least one processor to:

determine, for each line of a plurality of lines connected to a plurality of nodes, based at least in part on real and reactive power flow, an amount of overload for each time segment of a time period;

identify, based on the amount of overload for each time segment of the time period, one or more overloaded lines;

determine, for each of the one or more overloaded lines, based on a number of time segments of the time period that the one or more overloaded lines are overloaded, an allocated cost of capacity (ACC) for each overloaded time segment;

determine, for each of the one or more overloaded lines, based on a partial derivative of a magnitude of current of the one or more overloaded lines with respect to real power injection at each node, a locational marginal value (LMV) for a real power injection at each node connected to the one or more overloaded lines;

determine, for each of the one or more overloaded lines, based on a partial derivative of the magnitude of current of the one or more overloaded lines with respect to reactive power injection at each node, a locational marginal value (LMV) for a reactive power injection at each node connected to the one or more overloaded lines;

determine, for each of the one or more overloaded lines, based on the LMV for the real power injection, the LMV for the reactive power injection, and the ACC for each overloaded time segment, a spatiotemporal distributed energy resource (DER) value;

identify, based on the spatiotemporal DER value, one or more nodes as one or more candidate nodes for DER injection; and cause a DER injection at at least one of the one or more candidate nodes to alleviate overload.

* * * * *